(12) United States Patent
Oka et al.

(10) Patent No.: US 11,029,478 B2
(45) Date of Patent: Jun. 8, 2021

(54) POLYETHYLENE RESIN FOR USE IN SPACER FOR OPTICAL FIBER CABLE AND SPACER FOR OPTICAL FIBER CABLE USING THE SAME

(71) Applicant: SUMITOMO ELECTRIC INDUSTRIES, LTD., Osaka (JP)

(72) Inventors: Ryoei Oka, Yokohama (JP); Fumiaki Sato, Yokohama (JP); Kentaro Takeda, Yokohama (JP); Takao Hirama, Yokohama (JP); Taro Fujita, Yokohama (JP); Ken Takahashi, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 159 days.

(21) Appl. No.: 16/318,760

(22) PCT Filed: Oct. 4, 2017

(86) PCT No.: PCT/JP2017/036117
§ 371 (c)(1),
(2) Date: Jan. 18, 2019

(87) PCT Pub. No.: WO2019/069391
PCT Pub. Date: Apr. 11, 2019

(65) Prior Publication Data
US 2020/0292772 A1    Sep. 17, 2020

(51) Int. Cl.
*G02B 6/44* (2006.01)
*C08L 23/06* (2006.01)

(52) U.S. Cl.
CPC ............ *G02B 6/4432* (2013.01); *C08L 23/06* (2013.01)

(58) Field of Classification Search
None
See application file for complete search history.

(56) References Cited

U.S. PATENT DOCUMENTS 6,545,093 B1    4/2003 de Lange et al.

FOREIGN PATENT DOCUMENTS

| JP | H02-72311 A | 3/1990 |
|----|---|---|
| JP | H07-333476 A | 12/1995 |
| JP | H09-015466 A | 1/1997 |
| JP | H10-010385 A | 1/1998 |
| JP | H11-211948 A | 8/1999 |
| JP | 2002-069205 A | 3/2002 |
| JP | 2002-528586 A | 9/2002 |
| JP | 2008-286942 A | 11/2008 |
| WO | WO-2016/075164 A1 | 5/2016 |

*Primary Examiner* — Chad H Smith
(74) *Attorney, Agent, or Firm* — Faegre Drinker Biddle & Reath LLP

(57) ABSTRACT

Provided is a polyethylene resin for use in a spacer for an optical fiber cable, the polyethylene resin having a density of 0.952 g/cm$^3$ or more, containing a polyethylene having a molecular weight of 10,000 or less in a weight fraction of 22% or more, and containing a polyethylene having a molecular weight of 300,000 or more in a weight fraction of 12% or more.

1 Claim, 1 Drawing Sheet

POLYETHYLENE RESIN FOR USE IN SPACER FOR OPTICAL FIBER CABLE AND SPACER FOR OPTICAL FIBER CABLE USING THE SAME

TECHNICAL FIELD

The present invention relates to a polyethylene resin for use in a spacer for an optical fiber cable and to a spacer for an optical fiber cable using the same.

BACKGROUND ART

PTL 1 discloses a polyethylene resin for use in a spacer for an optical fiber cable in which in a polyethylene resin for use in a spacer for an optical fiber cable having a spiral groove for storing an optical fiber provided on an outer periphery thereof, the polyethylene resin has a melt index of 0.01 g/10 min or more and less than 0.30 g/10 min, a density of from 0.941 to 0.955 g/cm$^3$, and a flow ratio of from 20 to 55.

CITATION LIST

Patent Literature

PTL 1 JP-A H07-333476

SUMMARY OF INVENTION

A polyethylene resin for use in a spacer for an optical fiber cable according to an aspect of the present disclosure,
  has a density of 0.952 g/cm$^3$ or higher,
  contains a polyethylene having a molecular weight of 10,000 or less in a weight fraction of 22% or more, and
  contains a polyethylene having a molecular weight of 300,000 or more in a weight fraction of 12% or more.

A polyethylene resin for use in a spacer for an optical fiber cable according to an aspect of the present disclosure,
  has a density of 0.952 g/cm$^3$ or higher, and
  has a ratio Mw/Mn of a weight average molecular weight Mw to a number average molecular weight Mn being 13 or more.

A polyethylene resin for use in a spacer for an optical fiber cable according to an aspect of the present disclosure,
  has a density of 0.952 g/cm$^3$ or higher, and
  has a half-width of a crystallization peak being 13° C. or more.

A spacer for an optical fiber cable according to an aspect of the present disclosure contains the polyethylene resin according to an aspect of the present invention having a tensile strength of 25 MPa or more, and has an average surface roughness according to JIS B0601 being 1.2 μm or less.

DESCRIPTION OF EMBODIMENTS

Figure 1:
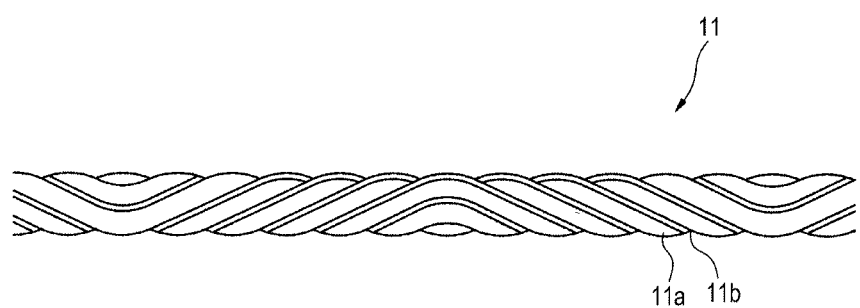
FIG. 1 This is a view illustrating an example of a spacer for an optical fiber cable according to an embodiment of the present invention.

Problems to be Solved by the Present Disclosure

In recent years, due to an increase in the amount of information to be communicated, there has been a strong demand for optical cables to increase transmission capacity, and efforts have been made to increase the number of optical fibers to be stored in one cable. In order to increase the number of optical fibers to be stored, it can be achieved by increasing the outer diameter of the cable. However, it is desirable to increase the number of stored cables without increasing the size of the cable because of the occurrence of problems such as limitations due to the diameter of the installation pipe and limitation in the length due to the size of the drum for winding the cable.

In an optical cable using a polyethylene spacer called a slot, a larger number of fibers can be stored by increasing the space for storing the optical fiber by making the rib of the slot narrower. However, since the strength decreases as the ribs are narrowed, the ribs may deform due to the lateral pressure during installation, which may adversely affect transmission characteristics in some cases.

On the other hand, in the case where a high-density polyethylene resin is used in a spacer for an optical fiber cable, increasing the density causes deterioration in the surface smoothness of the spacer and thus, the transmission characteristics may deteriorate in some cases. In addition, decreasing the density causes lowering in the rigidity of the spacer and thus, rib deformation may occur due to the lateral pressure during installation and the transmission characteristics may deteriorate in some cases.

An object of the present disclosure is to provide a polyethylene resin capable of providing a spacer with a high strength and excellent surface smoothness and a spacer for an optical fiber cable using the same.

Advantageous Effects of the Present Disclosure

According to the present disclosure, it is possible to provide a polyethylene resin capable of providing a spacer with a high strength and excellent surface smoothness and a spacer for an optical fiber cable using the same.

Description of Embodiments of the Present Invention

First, contents of embodiments of the present invention will be listed and described.

The polyethylene resin for use in a spacer for an optical fiber cable according to an embodiment of the present invention (1),
  has a density of 0.952 g/cm$^3$ or higher,
  contains a polyethylene having a molecular weight of 10,000 or less in a weight fraction of 22% or more, and
  contains a polyethylene having a molecular weight of 300,000 or more in a weight fraction of 12% or more.

According to this configuration, a polyethylene resin capable of providing a spacer with a high strength and excellent surface smoothness can be provided.

The polyethylene resin for use in a spacer for an optical fiber cable according to an embodiment of the present invention (2),
  has a density of 0.952 g/cm$^3$ or higher, and
  has a ratio Mw/Mn of the weight average molecular weight Mw to the number average molecular weight Mn being 13 or more.

According to this configuration, a polyethylene resin capable of providing a spacer with a high strength and excellent surface smoothness can be provided.

The polyethylene resin for use in a spacer for an optical fiber cable according to an embodiment of the present invention (3), has a density of 0.952 g/cm$^3$ or higher, and has a half-width of a crystallization peak being 13° C. or more.

According to this configuration, a polyethylene resin capable of providing a spacer with a high strength and excellent surface smoothness can be provided.

A spacer for an optical fiber cable according to an embodiment of the present invention (4), contains the polyethylene resin according to any one of (1) to (3) having a tensile strength of 25 MPa or more, and has an average surface roughness according to JIS B0601 being 1.2 µm or less.

According to this configuration, a spacer having a high strength and excellent surface smoothness can be provided.

Details of Embodiments of the Invention

Hereinafter, specific examples of the polyethylene resin for use in a spacer for an optical fiber cable according to an embodiment of the present invention and the spacer for an optical fiber cable using the polyethylene resin will be described with reference to the accompanying drawings.

First Embodiment

Figure 2:
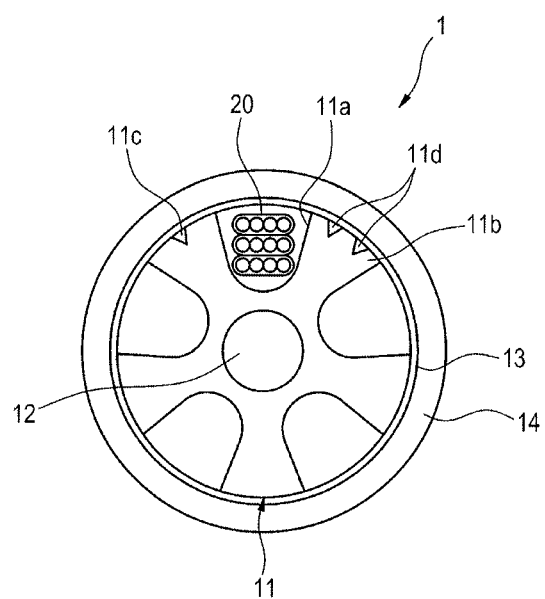
FIG. 2 This is a cross-sectional view illustrating an example of an optical fiber cable according to an embodiment of the present invention.

As illustrated in FIG. 1 and FIG. 2, an optical fiber cable 1 contains: a plurality of optical fiber tape ribbons 20; a spacer for an optical fiber cable (hereinafter referred to as a spacer) 11; an upper tape 13 appended longitudinally or wound transversely to wrap around the spacer 11; and an outer cover 14 covering the outer side of the spacer 11 wrapped with the upper tape 13.

The spacer 11 is a rod containing a tension member 12 embedded in the center portion and a plurality of slot grooves 11a on the outer surface side. The slot groove 11a is a groove for storing one or a plurality of the tape ribbons 20, and FIG. 2 illustrates an example having five slot grooves 11a. Although the slot groove 11a of the spacer 11 is formed in an S-Z manner in FIG. 1, the present invention is not limited thereto, and it may be formed in a spiral shape, for example.

The spacer 11 has a slot rib 11b for forming the slot groove 11a and separating it from another slot groove 11a. That is, the slot groove 11a is a groove between the adjacent slot ribs 11b. The shape of the slot groove 11a is exemplified by a U-shape, but the present invention is not limited thereto, and it may be, for example, a rectangular shape.

Furthermore, in order to identify the position of the predetermined slot groove 11a, a colored resin may be attached to the predetermined slot rib 11b, which separates that slot groove 11a, as identification marks 11c and 11d.

The tension member 12 can be appropriately selected from, for example, a single steel wire, a twisted steel wire, a fiber-reinforced resin linear material single wire (FRP single wire), a fiber-reinforced resin linear material twisted wire (FRP twisted wire), a rod of polyoxymethylene, a rod of a thermoplastic liquid crystal, and the like. The tension member 12 is appropriately selected depending on a tensile strength, a property of causing no electromagnetic wave induction and the like required for an optical cable.

In the spacer 11, the portion except for the tension member 12 is composed of a polyethylene resin that has a density of 0.952 g/cm$^3$ or higher, contains a polyethylene having a molecular weight of 10,000 or less in a weight fraction of 22% or more, and contains a polyethylene having a molecular weight of 300,000 or more in a weight fraction of 12% or more. The strength of the slot rib 11b can be maintained by using a polyethylene resin having a high density (0.952 g/cm$^3$ or more). In addition, in general, an increase in the resin density leads to an increase in crystallinity, which causes deterioration in the surface smoothness. However, crystallization can be suppressed by making the molecular weight distribution of the resin broad. Therefore, the use the polyethylene resin having the above-described composition can achieve the increase in the strength of the slot rib 11b and at the same time, can maintain the surface smoothness of the spacer 11 excellent though using a high-density resin. Therefore, the deterioration in transmission characteristics can be prevented.

The density of the polyethylene resin of the present embodiment is preferably 0.952 g/cm$^3$ or more and 0.970 g/cm$^3$ or less, and more preferably 0.952 g/cm$^3$ or more and 0.965 g/cm$^3$ or less. In the case where the density is less than 0.952 g/cm$^3$, the rigidity of the spacer 11 decreases, and thus deformation of the slot rib 11b occurs due to the lateral pressure during installation, leading to the deterioration in transmission characteristics. In the case where the density is larger than 0.970 g/cm$^3$, the surface smoothness or moldability of the spacer 11 may be deteriorated, which is not preferable.

The polyethylene resin of the present embodiment preferably contains the polyethylene having a molecular weight of 10,000 or less in a weight fraction of from 22% to 24%, and contains the polyethylene having a molecular weight of 300,000 or more in a weight fraction of from 12% to 18%. In the case where the polyethylene having a molecular weight of 10,000 or less is less than 22% in a weight fraction and the polyethylene having a molecular weight of 300,000 or more is less than 12% in a weight fraction, the molecular weight distribution becomes narrow, so that the surface smoothness of the spacer 11 cannot be favorably maintained. In the case where the polyethylene having a molecular weight of 10,000 or less is more than 24% in a weight fraction and the polyethylene having a molecular weight of 300,000 or more is more than 18% in a weight fraction, the productivity of the resin may be deteriorated, which is not preferable.

The polyethylene resin of the present embodiment includes both the case of a polyethylene resin produced by a polymerization reaction and the case of a polyethylene resin produced by blending plural kinds of polyethylene resins. For example, the polyethylene resin of the present embodiment can be produced by polymerizing so as to reduce the number of intramolecular branching chains of polyethylene in a polyethylene resin and performing multistage polymerization.

As the upper tape 13, use can be generally made of one obtained by forming a nonwoven fabric in a tape shape, one obtained by bonding a substrate such as PET to a nonwoven fabric, and the like. The upper tape 13 may be wound after winding a rough winding, which is not illustrated, around the outer periphery of the spacer 11. The outer cover 14 is generally made of a resin such as polyethylene, and is formed by extrusion molding.

Second Embodiment

The second embodiment of the present invention is similar to the first embodiment described above as for the structure and density itself. However, the portion except for the tension member 12 of the spacer 11 is composed of a polyethylene resin having a density of 0.952 g/cm$^3$ or higher, and having a ratio Mw/Mn of the weight average molecular weight Mw and the number average molecular weight Mn being 13 or more.

The weight average molecular weight Mw and the number average molecular weight Mn can be determined by gel permeation chromatography (GPC). The Mw/Mn is preferably 13 or more and 28 or less, and more preferably 13 or more and 25 or less. In the case where Mw/Mn is less than 13, the molecular weight distribution becomes narrow, so that the surface smoothness of the spacer 11 cannot be favorably maintained. In the case where Mw/Mn is larger than 28, the productivity of the resin may deteriorate, which is not preferable.

Similar to the case of the first embodiment, the density of the polyethylene resin of the present embodiment is preferably 0.952 g/cm$^3$ or more and 0.970 g/cm$^3$ or less, more preferably 0.952 g/cm$^3$ or more and 0.965 g/cm$^3$ or less. Similar to the case of the first embodiment, the polyethylene resin of the present embodiment includes both the case of a polyethylene resin produced by a polymerization reaction and the case of a polyethylene resin produced by blending plural kinds of polyethylene resins.

Third Embodiment

The third embodiment of the present invention is similar to the first embodiment described above as for the structure and density itself. However, the portion except for the tension member 12 of the spacer 11 is composed of a polyethylene resin having a density of 0.952 g/cm$^3$ or more, and having a half-width of the crystallization peak being 13° C. or more.

The half-width of the crystallization peak is preferably 13° C. or more and 15° C. or less. In the case of less than 13° C., the molecular weight distribution becomes narrow, so that the surface smoothness of the spacer 11 cannot be favorably maintained. In the case of more than 15° C., the productivity of the resin may be deteriorated, which is not preferable.

Similar to the case of the first embodiment, the density of the polyethylene resin of the present embodiment is preferably 0.952 g/cm$^3$ or more and 0.970 g/cm$^3$ or less, more preferably 0.952 g/cm$^3$ or more and 0.965 g/cm$^3$ or less. Similar to the case of the first embodiment, the polyethylene resin of the present embodiment includes both the case of a polyethylene resin produced by a polymerization reaction and the case of a polyethylene resin produced by blending plural kinds of polyethylene resins.

The polyethylene resins used in the spacer 11 of the first to third embodiments have a tensile strength of 25 MPa or more. The spacer 11 of this embodiment has an average surface roughness measured by JIS B0601 of 1.2 μm or less. The tensile strength of the polyethylene resin is preferably 25 MPa or more and 32 MPa or less. In the case of less than 25 MPa, the strength of the slot rib 11b is insufficient. In the case of more than 32 MPa, the flat surface smoothness may be deteriorated, which is not preferable. The average surface roughness of the spacer 11, measured by JIS B0601, is preferably 1.2 μm or less, and more preferably 1.0 μm or less.

EXAMPLES

Examples of the present invention are shown below and the present invention will now be described in detail. The present invention is not limited to these Examples.

Example 1

A polyethylene resin having physical property values as shown in Example 1 of Table 1 was extrusion-coated on a steel wire of 2.6 mmϕ, and molded into a spacer having an outer diameter at the rib top part being 8.5ϕ on which five spiral grooves having a rib width of 1.5 mm, depth of 2.3 mm and S-Z twisting pitch of 500 mm were formed. The extrusion linear velocity during molding was 15 m/min, and the length of the spacer was 1000 m. Table 1 shows the physical property values of the resin used.

The Mw/Mn, weight fraction of polyethylene having a molecular weight of 10,000 or less and weight fraction of polyethylene having a molecular weight of 300,000 or more shown in the Table were determined by measuring the molecular weight of the resin by a high-temperature GPC measurement apparatus (HLC-8321 GPC/HT) manufactured by Tosoh Corporation. The detailed conditions are as follows.

Apparatus: HLC-8321 GPC/HT (manufactured by Tosoh Corporation)

Column: TSKgel guardcolumn H-HR (30) HT (ϕ7.5 mm×7.5 cm) (manufactured by Tosoh Corporation)×1

TSKgel GMR-HR–H(20) HT (ϕ7.8 mm×30 cm) (manufactured by Tosoh Corporation)×3 pieces Eluent: 1,2,4-trichlorobenzene for HPLC+BHT (0.05%)

Flow rate: 1.0 mL/min

Injection volume: 0.3 mL

Column temperature: 140° C.

Sample concentration: 1 mg/mL

Sample Pretreatment: A sample was weighed, thereto was added solvent (1,2,4-trichlorobenzene with 0.1% BHT added), followed by melt-infiltrating at 140° C. for 1 hour, and the measurement was performed.

Calibration curve: A fifth-order approximation curve using polystyrene was used, and the molecular weight was converted into a PE equivalent molecular weight by using a Q-factor.

The half-width of the crystallization peak was measured by a differential scanning calorimetry under the following conditions.

Apparatus: Differential Thermal Analysis Apparatus DSC-50 (manufactured by Shimadzu Corporation)

Temperature program: room temperature→200° C.→0° C. (hold for 5 min)

Temperature elevation rate: ±10° C./min

The tensile yield stress of the resin was measured according to JIS K 7127 at a tensile speed of 200 mm/min by using a JIS-2 test piece. The density was measured according to JIS K7112.

Example 2

A spacer was molded in the same manner as in Example 1, except that a polyethylene resin having a molecular weight distribution as shown in Example 2 of Table 1 was used.

Example 3

A spacer was molded in the same manner as in Example 1, except that a polyethylene resin having a molecular weight distribution as shown in Example 3 of Table 1 was used.

Example 4

A spacer was molded in the same manner as in Example 1, except that a polyethylene resin having a molecular weight distribution as shown in Example 4 of Table 1 was used.

Example 5

A spacer was molded in the same manner as in Example 1, except that a polyethylene resin having a molecular weight distribution as shown in Example 5 of Table 1 was used.

TABLE 1

|  | Density (g/cm³) | Mw/Mn | Weight fraction of polyethylene having molecular weight of 10,000 or less (%) | Weight fraction of polyethylene having molecular weight of 300,000 or more (%) | Half-width of crystallization peak (° C.) | Tensile yield stress (MPa) |
| --- | --- | --- | --- | --- | --- | --- |
| Example 1 | 0.952 | 25 | 24 | 18 | 14 | 27 |
| Example 2 | 0.955 | 20 | 23 | 15 | 14.5 | 29 |
| Example 3 | 0.962 | 13 | 22 | 12 | 13 | 32 |
| Example 4 | 0.948 | 29 | 25 | 20 | 15.2 | 24 |
| Example 5 | 0.955 | 5 | 10 | 7 | 12.8 | 28 |

(1) Moldability

The moldability of the spacers of Example 1 to Example 5 was confirmed. The moldability was evaluated as "pass" unless the shape of the spacer was broken.

(2) Surface Roughness

Regarding the surface roughness of the bottom surface of the storage groove of the spacer, the arithmetic mean surface roughness (Ra; unit μm) was measured according to JIS B0601 under the conditions of a measurement speed of 0.1 mm/sec, a cut-off of 0.8 mm, and a measurement length of 2.4 mm.

(3) Slot Winding Test

The spacer was wound two layers on a drum having a diameter of 600 mm at a tension of 500 N, followed by feeding, and visually checked whether deformation of the rib was present at the portion where slots were overlaid and in contact with each other (between the first layer and second layer). The case where the deformation was confirmed was judged as "fail", and the case where the deformation was not confirmed was judged as "pass".

Table 2 shows the evaluation results of the spacers of Examples 1 to 5. The acceptance criterion of the surface roughness is 1.2 μm or less.

TABLE 2

|  | Moldability | Surface roughness (μm) | Slot winding test |
| --- | --- | --- | --- |
| Example 1 | Pass | 0.87 | Pass |
| Example 2 | Pass | 0.88 | Pass |
| Example 3 | Pass | 0.94 | Pass |
| Example 4 | Pass | 0.6 | Fail |
| Example 5 | Pass | 1.5 | Pass |

The spacers of Example 1 to Example 3 passed all of the moldability, surface roughness and slot winding test. However, although the moldability of Example 3 was acceptable, there was a part where the shape of the spacer was partially broken while it was slight.

The spacer of Example 4 did not meet the acceptance criterion of the slot winding test.

The spacer of Example 5 had a surface roughness larger than the criterion and judged as "fail".

REFERENCE SIGNS LIST

1: optical cable, 11: spacer, 11a: slot groove, 11b: slot rib, 11c, 11d: colored resin, 12: tension member, 13: upper tape, 14: outer cover of optical cable, 20: tape ribbon

The invention claimed is:

1. A spacer for an optical fiber cable, comprising:
a polyethylene resin having a density of 0.952 g/cm³ or more, the polyethylene resin comprising:
 a polyethylene having a molecular weight of 10,000 or less in a weight fraction of 22% or more, and
 a polyethylene having a molecular weight of 300,000 or more in a weight fraction of 12% or more,
having a tensile strength of 25 MPa or more, and
having an average surface roughness of 1.2 μm or less.

* * * * *